US011952810B2

United States Patent
Fuentes et al.

(10) Patent No.: US 11,952,810 B2
(45) Date of Patent: Apr. 9, 2024

(54) HOOD RELEASE LEVER COVER ASSEMBLY FOR A VEHICLE

(71) Applicants: Nissan North America, Inc., Franklin, TN (US); NISSAN MOTOR CO., LTD., Yokohama (JP)

(72) Inventors: Bobby Fuentes, Novi, MI (US); Takeharu Iwata, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 814 days.

(21) Appl. No.: 17/035,563

(22) Filed: Sep. 28, 2020

(65) Prior Publication Data

US 2022/0098906 A1 Mar. 31, 2022

(51) Int. Cl.
*E05B 83/24* (2014.01)
*B60R 13/02* (2006.01)
(Continued)

(52) U.S. Cl.
CPC ........ *E05B 83/243* (2013.01); *B60R 13/0275* (2013.01); *E05B 13/001* (2013.01); *E05B 85/10* (2013.01); *E05Y 2201/11* (2013.01); *E05Y 2201/626* (2013.01); *E05Y 2600/31* (2013.01); *E05Y 2600/622* (2013.01); *E05Y 2600/626* (2013.01); *E05Y 2900/536* (2013.01)

(58) Field of Classification Search
CPC ...... E05B 13/00; E05B 13/001; E05B 1/0061; E05B 1/0084; E05B 1/0092; E05B 1/04; E05B 5/00; E05B 5/006; E05B 7/00; E05B 83/16; E05B 83/24; E05B 83/243; E05B 83/247; E05B 85/10; E05B 85/12; E05B 85/14; E05B 85/16; E05B 13/002
See application file for complete search history.

(56) References Cited

U.S. PATENT DOCUMENTS 2,145,968 A * 2/1939 Bozarth .................. E05B 83/24
292/341.15
2,232,865 A * 2/1941 Pizzo ...................... E05B 83/24
292/41
(Continued)

FOREIGN PATENT DOCUMENTS

DE 10047839 A1 4/2002
JP H05112140 A 5/1993

OTHER PUBLICATIONS

"www.ebay.com/itm/electrical-lockout-round-switch-lock-out-device-push-button-30mm-dia-home-loto-/182221011088", Sep. 28, 2020.

*Primary Examiner* — Christine M Mills
*Assistant Examiner* — Faria F Ahmad
(74) *Attorney, Agent, or Firm* — Global IP Counselors, LLP (57) ABSTRACT

A release lever cover assembly for a vehicle includes a bracket assembly, a first release lever, and a release lever cover. The bracket assembly is configured to be connected to a vehicle body structure of the vehicle. The first release lever is pivotally connected to the bracket assembly. The first release lever is movable between a first position and a second position in which a vehicle component is released. The release lever cover is slidably connected to the bracket assembly. The release lever cover is movable between a first position preventing movement of the first release lever and a second position allowing movement of the first release lever.

20 Claims, 10 Drawing Sheets (51) Int. Cl.
*E05B 13/00* (2006.01)
*E05B 85/10* (2014.01)

(56) References Cited

U.S. PATENT DOCUMENTS

| | | | | |
|---|---|---|---|---|
| 2,246,794 | A * | 6/1941 | Dall | E05B 83/16 292/99 |
| 2,593,573 | A * | 4/1952 | Kulbersh | E05C 1/163 292/169.18 |
| 3,423,974 | A * | 1/1969 | Bernsley | E05B 13/002 70/447 |
| 3,748,882 | A * | 7/1973 | Dusault, Jr. | E05B 13/001 70/447 |
| 3,888,096 | A * | 6/1975 | Huss | E05B 13/001 70/416 |
| 4,279,137 | A * | 7/1981 | Cook | E05B 13/04 70/416 |
| 4,285,221 | A * | 8/1981 | Atchisson | E05B 13/001 70/424 |
| 4,503,692 | A * | 3/1985 | Grint | E05B 13/001 70/424 |
| 4,588,219 | A * | 5/1986 | Kobayashi | E05B 85/18 292/DIG. 31 |
| 4,673,202 | A * | 6/1987 | Willis | E05B 13/04 292/264 |
| 4,816,807 | A * | 3/1989 | Schmitt | E05B 45/083 49/141 |
| 4,827,745 | A * | 5/1989 | Baugh | E05B 13/002 70/211 |
| 4,869,086 | A * | 9/1989 | Richards | E05B 13/002 70/210 |
| 4,885,921 | A * | 12/1989 | Sharav | E05B 13/04 70/159 |
| 4,947,663 | A * | 8/1990 | Yeager | E05B 13/002 70/419 |
| 5,000,498 | A * | 3/1991 | Upchurch | E05B 13/04 292/288 |
| 5,007,263 | A * | 4/1991 | Taylor | E05B 13/04 292/288 |
| 5,052,202 | A * | 10/1991 | Murphy | E05B 13/04 70/211 |
| 5,067,334 | A * | 11/1991 | Sorkilmo | E05B 13/002 70/211 |
| 5,083,823 | A * | 1/1992 | Fann | E05B 3/065 292/359 |
| 5,313,812 | A * | 5/1994 | Eklund | E05B 13/04 70/416 |
| 5,369,971 | A * | 12/1994 | Sheppard | E05B 13/001 70/416 |
| 5,515,704 | A * | 5/1996 | van Nguyen | E05B 13/002 292/288 |
| 5,560,235 | A * | 10/1996 | Aucoin | E05B 13/001 70/168 |
| 5,560,659 | A * | 10/1996 | Dault | E05B 77/06 292/336.3 |
| 5,647,248 | A * | 7/1997 | Silsby, Jr. | E05B 17/002 D8/322 |
| 5,651,279 | A * | 7/1997 | Berton | E05B 13/001 70/211 |
| 5,692,401 | A * | 12/1997 | Khalsa | E05B 13/001 70/95 |
| 5,775,149 | A * | 7/1998 | Small | E05C 19/182 292/289 |
| 5,853,060 | A * | 12/1998 | Chao | E05B 83/16 292/216 |
| 5,865,050 | A * | 2/1999 | Michaud | E05B 63/0065 70/482 |
| 5,904,385 | A * | 5/1999 | Linder | E05B 85/107 292/DIG. 31 |
| 5,950,465 | A * | 9/1999 | Schultz | E05B 13/04 70/416 |
| 5,961,165 | A * | 10/1999 | Aizawa | E05B 85/18 292/336.3 |
| 6,105,406 | A * | 8/2000 | Thompson | E05B 13/002 70/211 |
| 6,658,906 | B1 * | 12/2003 | Wright | E05B 13/001 70/424 |
| 6,742,369 | B1 * | 6/2004 | Veillette | E05B 13/002 292/288 |
| 6,993,944 | B2 * | 2/2006 | Hicks | E05B 13/04 70/211 |
| 7,048,315 | B2 * | 5/2006 | Wong | E05B 13/002 292/297 |
| 7,108,301 | B2 * | 9/2006 | Louvel | E05B 79/06 292/201 |
| 7,210,320 | B1 * | 5/2007 | Nokleberg | E05B 13/002 70/211 |
| 7,380,864 | B2 * | 6/2008 | Guanzon | E05B 85/12 296/146.7 |
| 7,802,828 | B2 * | 9/2010 | Hopkins | E05B 13/001 292/288 |
| 8,011,213 | B1 * | 9/2011 | Gogel | E05B 83/10 292/259 R |
| 8,109,545 | B2 * | 2/2012 | Lukas | E05B 85/16 292/87 |
| 8,881,561 | B2 * | 11/2014 | Niehausmeier | E05B 13/001 70/91 |
| 9,518,410 | B2 * | 12/2016 | Vasi | E05B 81/08 |
| 9,982,455 | B2 * | 5/2018 | Badhya | E05B 55/005 |
| 10,181,233 | B1 | 1/2019 | Haber | G07C 9/00309 |
| 10,221,587 | B1 * | 3/2019 | Bergman | E05B 13/002 |
| 10,501,962 | B2 * | 12/2019 | Murphy | E05C 1/163 |
| 10,753,121 | B2 * | 8/2020 | Morse | E05B 13/004 |
| 2003/0070456 | A1 * | 4/2003 | Zamberg | E05B 13/001 70/208 |
| 2009/0235704 | A1 * | 9/2009 | Quach | E05B 13/002 70/416 |
| 2014/0165668 | A1 * | 6/2014 | Niehausmeier | E05B 13/001 70/101 |
| 2018/0291648 | A1 * | 10/2018 | Sanchez | E05B 13/002 |
| 2020/0347639 | A1 * | 11/2020 | Mano | E05B 15/02 |
| 2022/0081943 | A1 * | 3/2022 | Fuentes | E05B 83/243 |
| 2022/0097775 | A1 * | 3/2022 | Fuentes | E05B 85/10 |

* cited by examiner

HOOD RELEASE LEVER COVER ASSEMBLY FOR A VEHICLE

BACKGROUND

Field of the Invention

The present invention generally relates to a hood release lever cover assembly for a vehicle. More specifically, the present invention relates to a hood release lever cover assembly in which a hood release lever cover substantially prevents accidental movement of a hood release lever.

Background Information

A hood release lever for releasing a hood of a vehicle is disposed in a passenger compartment of a vehicle. The hood release lever is operated to release a hood of the vehicle.

SUMMARY

A need exists for a hood release lever cover assembly in which a hood release lever cover substantially prevents accidental movement of a hood release lever.

In view of the state of the known technology, one aspect of the present disclosure is to provide a release lever cover assembly for a vehicle including a bracket assembly, a first release lever, and a release lever cover. The bracket assembly is configured to be connected to a vehicle body structure of the vehicle. The first release lever is pivotally connected to the bracket assembly. The first release lever is movable between a first position and a second position in which a vehicle component is released. The release lever cover is slidably connected to the bracket assembly. The release lever cover is movable between a first position preventing movement of the first release lever and a second position allowing movement of the first release lever.

Another aspect of the present invention is to provide a release lever cover assembly for a vehicle. A recessed portion is disposed in a vehicle body structure. A bracket assembly is disposed in the recessed portion of the vehicle body structure. The bracket assembly includes a first pin and a second pin. A first release lever is pivotally connected to the first pin of the bracket assembly. The first release lever is movable between a first position and a second position in which a vehicle component is released. A release lever cover is slidably connected to the second pin of the bracket assembly. The release lever cover is movable between a first position preventing movement of the first release lever and a second position allowing movement of the first release lever.

Also other objects, features, aspects and advantages of the disclosed hood release lever cover assembly for a vehicle will become apparent to those skilled in the art from the following detailed description, which, taken in conjunction with the annexed drawings, discloses exemplary embodiments of the hood release lever cover assembly for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
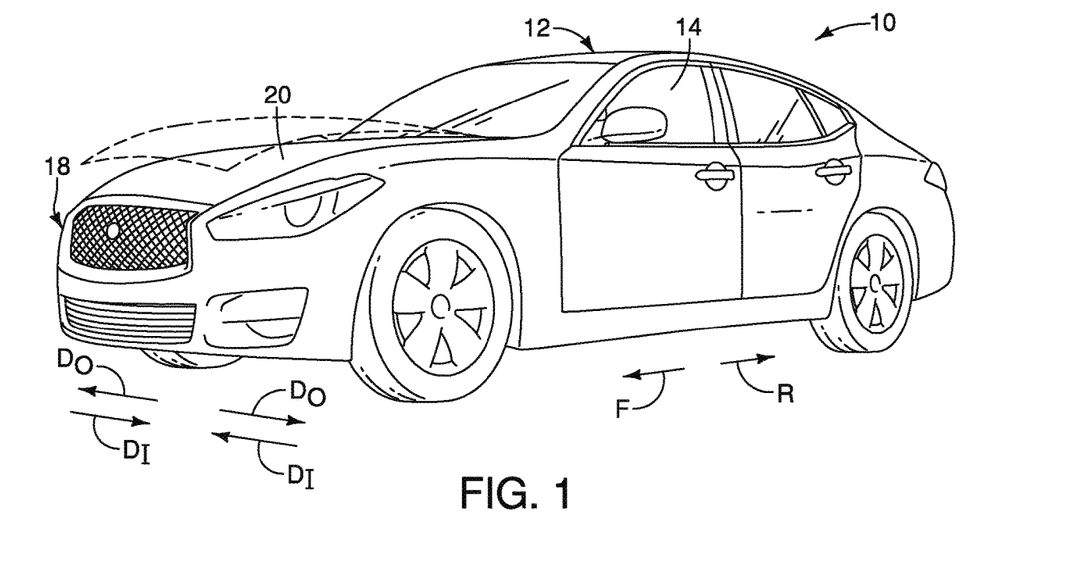
FIG. 1 is a perspective view of a vehicle including a hood release lever cover assembly in accordance with an exemplary embodiment of the present invention.
Figure 2:
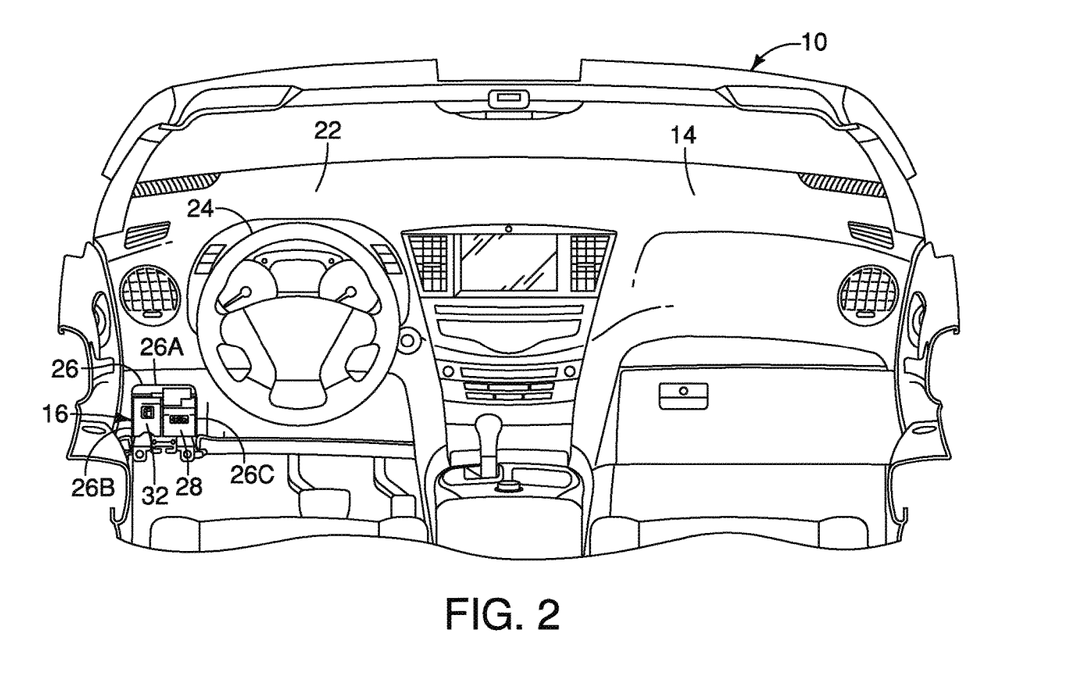
FIG. 2 is an elevational view of a dashboard of the vehicle of FIG. 1 including the hood release lever cover assembly.

Referring initially to FIGS. 1 and 2, a vehicle 10 is illustrated in accordance with an exemplary embodiment of the present invention. The vehicle 10 includes a vehicle body structure 12 that defines a vehicle interior 14 and includes a hood release lever cover assembly 16 disposed in the vehicle interior 14 of the vehicle 10. The vehicle interior 14 can be a passenger compartment within the vehicle 10. The vehicle body structure 12 includes, among other structures, a front-end structure 18 and a hood 20. The hood 20 is movably connected to the front-end structure 18 to be movable between a first, or closed position (shown in solid lines), and a second, or open, position (shown in dashed lines), as shown in FIG. 1.

As shown in FIG. 2, an instrument panel, or vehicle dashboard, 22 is located within the vehicle interior 14. A steering wheel 24 is connected to a steering column (not shown), which passes through the instrument panel 22.

The instrument panel 22 includes a recessed portion 26, as shown in FIGS. 2, 9, 10 and 15. The recessed portion 26 is defined by an upper wall 26A, oppositely disposed side walls 26B and 26C and a rear wall 26D.

Figure 3:
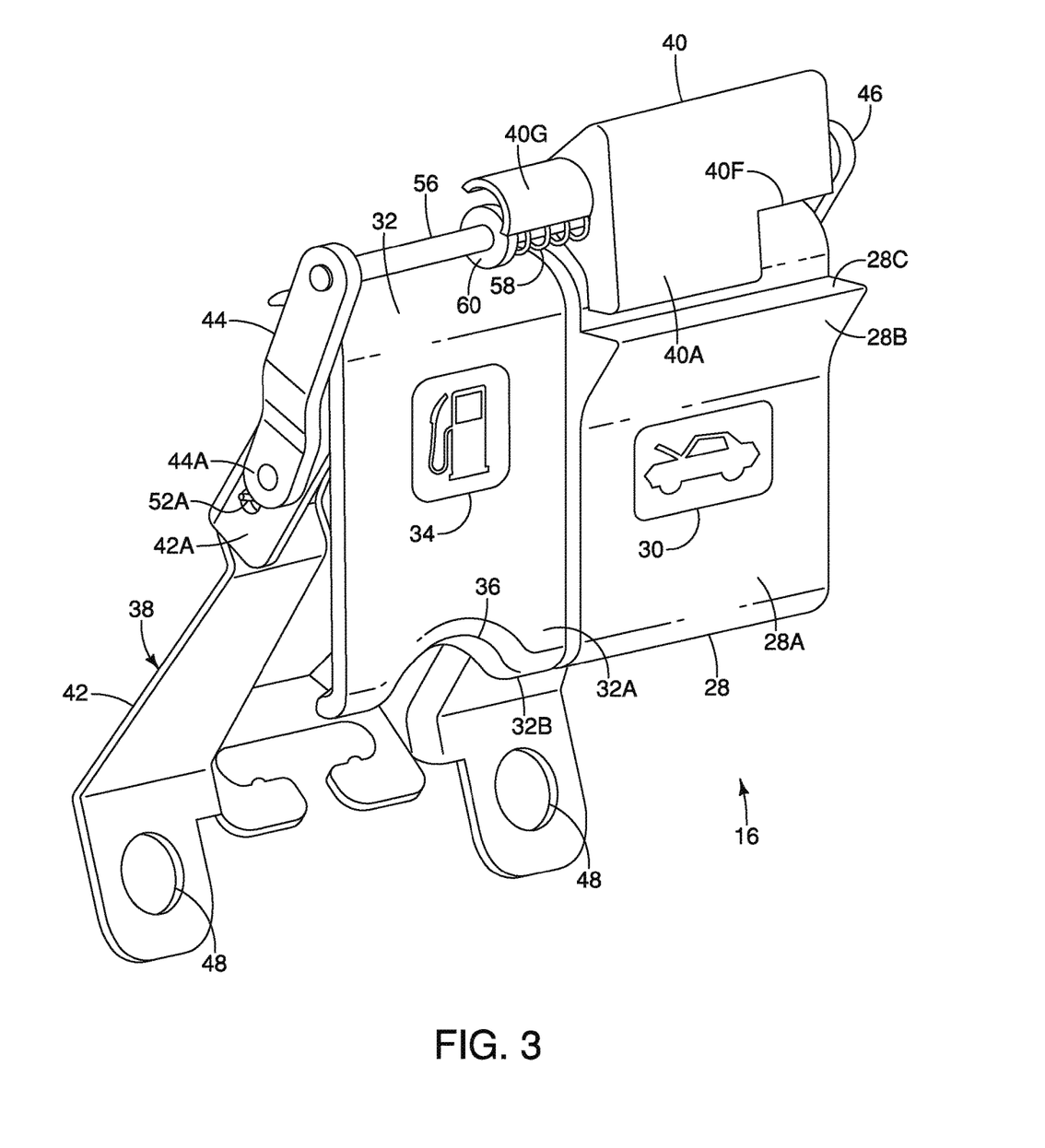
FIG. 3 is a perspective view of the hood release lever cover assembly of FIG. 2 in which a hood release lever cover is in a first position.
Figure 4:
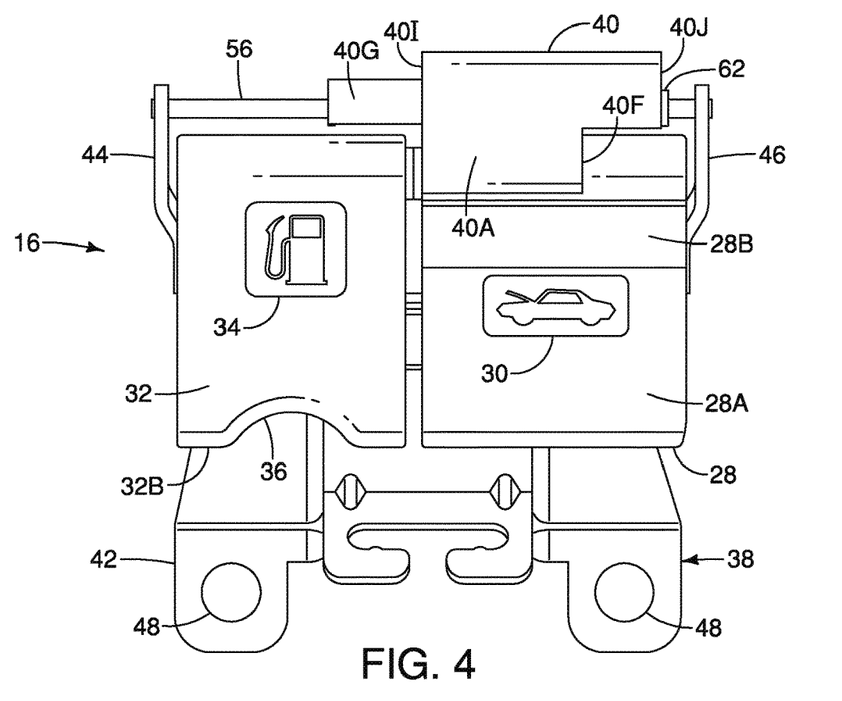
FIG. 4 is a front elevational view of the hood release lever cover assembly of FIG. 3.
Figure 9:
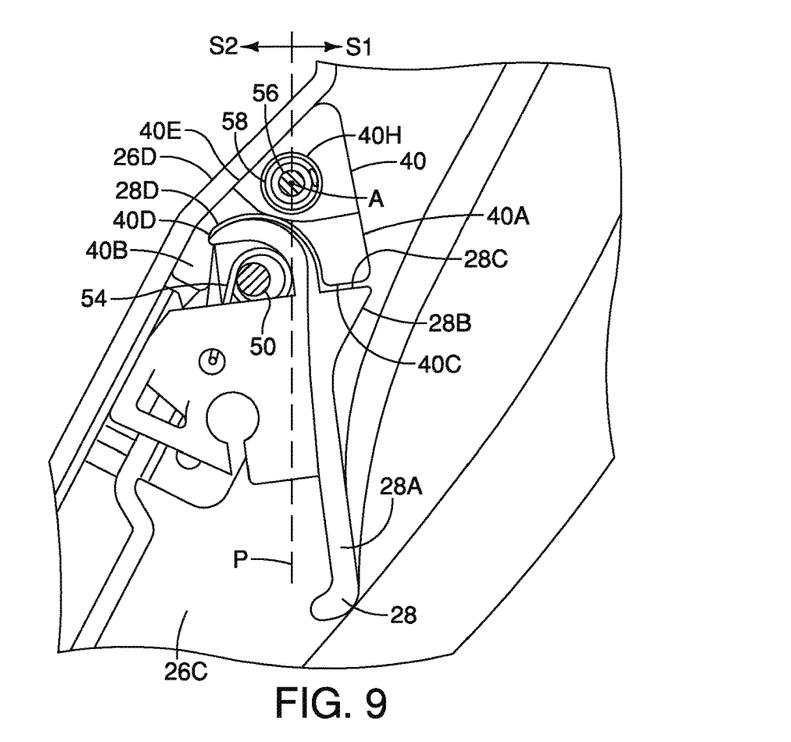
FIG. 9 is a side elevational view in cross section of the hood release lever cover assembly of FIG. 8.
Figure 10:
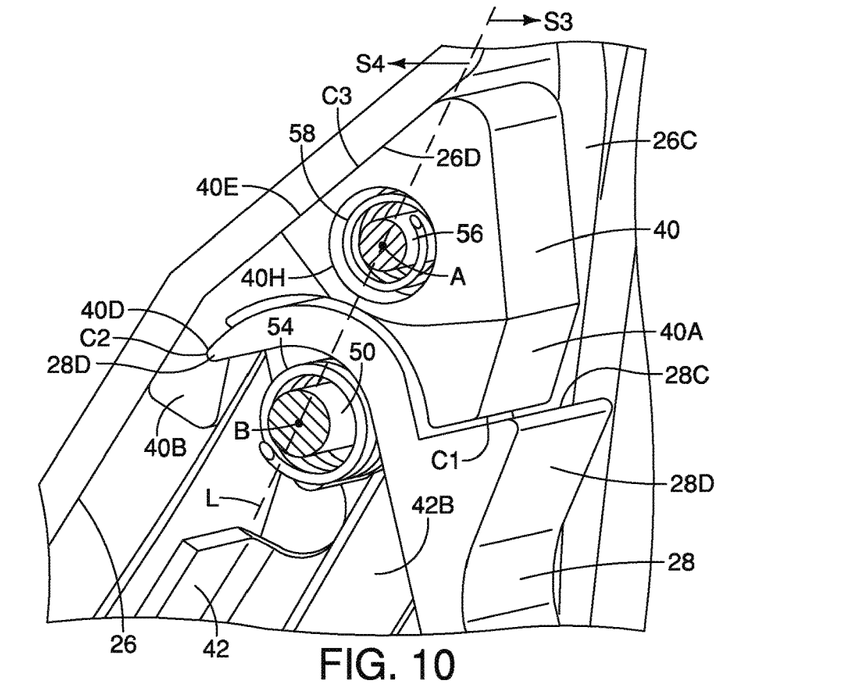
FIG. 10 is a perspective view in cross section of the hood release lever cover assembly of FIG. 9.
Figure 15:
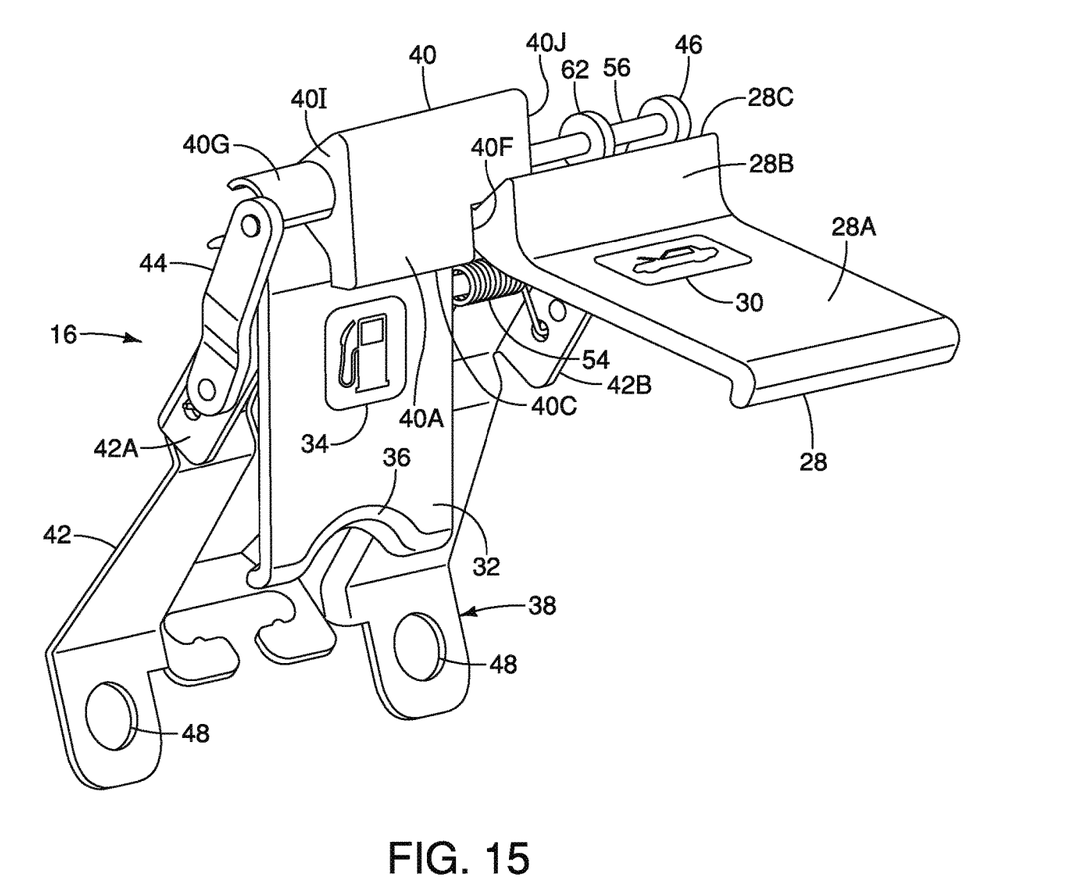
FIG. 15 is a perspective view of the hood release cover assembly of FIG. 11 in which the hood release lever cover and the hood release lever are in second positions.

A hood release lever 28 is pivotally disposed in the recessed portion 26, as shown in FIGS. 2, 9 and 10. The hood release lever 28 is pivotally connected to the instrument panel 22 of the vehicle body structure 12. The hood release lever 28 is movable between a first position, as shown in FIGS. 3 and 4, and a second position, as shown in FIG. 15. Moving the hood release lever 28 from the first position to the second position releases the hood 20, as shown in FIG. 1. An icon 30 indicating a vehicle with a released hood is disposed on a front surface 28A of the hood release lever 28, as shown in FIGS. 3 and 4.

A projection 28B extends outwardly from the hood release lever 28, as shown in FIGS. 3, 4 and 8-12. The projection 28B extends forwardly from the front surface 28A of the hood release lever 28. The projection 28B has an upper surface 28C that extends substantially perpendicularly to the front surface 28A of the hood release lever 28, as shown in FIG. 9. An upper end of the hood release lever 28 defines an arcuate portion 28D, as shown in FIGS. 7-19. Mounting portions 28E and 28F extend from the upper end of the hood release lever 28.

A fuel tank door release lever 32 is movably disposed in the recessed portion 26 of the instrument panel 22, as shown in FIGS. 2 and 15. The fuel tank door release lever 32 is disposed adjacent the hood release lever 28. The fuel tank door release lever 32 is preferably disposed in a vehicle outboard direction DO (FIG. 1) of the hood release lever 28. In other words, the hood release lever 28 is disposed in a vehicle inboard (DI) direction of the fuel tank door release lever 32. The fuel tank door release lever 32 is laterally spaced from the hood release lever 28, as shown in FIGS. 3-5 and 11-13 such that one of the hood release lever 28 and the fuel tank door release lever 32 can be operated without interfering with the other of the hood release lever 28 and the fuel tank door release lever 32. An icon 34 indicating a fuel pump is disposed on a front surface 32A of the fuel tank door release lever 32. A recess 36 can be disposed in a lower edge 32B of the fuel tank door release lever 32, as shown in FIGS. 3 and 4, to facilitate moving the fuel tank door release lever 32 between the first and second positions.

The hood release lever cover assembly 16 includes a bracket assembly 38, a hood release lever cover 40, and the hood release lever 28, as shown in FIGS. 2-6 and 11-15. The hood release lever cover assembly 16 can further include the fuel tank door release lever 32. The bracket assembly 38 is configured to be connected to the recessed portion 26 of the instrument panel 22 of the vehicle body structure 12 of the vehicle 10. The hood release lever 28 is pivotally connected to the bracket assembly 38. The hood release lever 28 is movable between a first position, as shown in FIGS. 3 and 4, and a second position, as shown in FIG. 15, in which the vehicle hood 20 is released. The hood release lever cover 40 is slidably connected to the bracket assembly 38. The hood release lever cover 40 is movable between a first position, as shown in FIGS. 2-10, preventing movement of the hood release lever 28 of the vehicle 10 and a second position, as shown in FIGS. 11-15, allowing movement of the hood release lever 28.

The bracket assembly 38 includes a mounting body 42 and first and second mounting anus 44 and 46 extending outwardly from the mounting body 42, as shown in FIGS. 3-6 and 11-15. The mounting body 42 has at least one fastener opening 48 configured to receive a fastener to secure the bracket assembly 38 to the rear wall 26D of the recessed portion 26 of the vehicle body structure 12 (FIG. 1). The mounting body 42 has two fastener openings 48, although any suitable number of fastener openings can be used. First and second mounting tabs 42A and 42B extend outwardly from opposite edges of the mounting body 42. The mounting body 42 of the bracket assembly 38 is preferably made of a metallic material, although any suitable material can be used.

The first and second mounting arms 44 and 46 extend outwardly from the mounting body 42, as shown in FIGS. 3-6 and 11-15. The first mounting arm 44 has a first end 44A connected to the first mounting tab 42A of the mounting body 42. The second mounting arm 46 has a first end 46A connected to the second mounting tab 429 of the mounting body 42. The first and second mounting arms 44 and 46 can be connected to the first and second mounting tabs 42A and 42B, respectively, of the mounting body 42 in any suitable manner, such as with fasteners or by welding.

Figure 13:
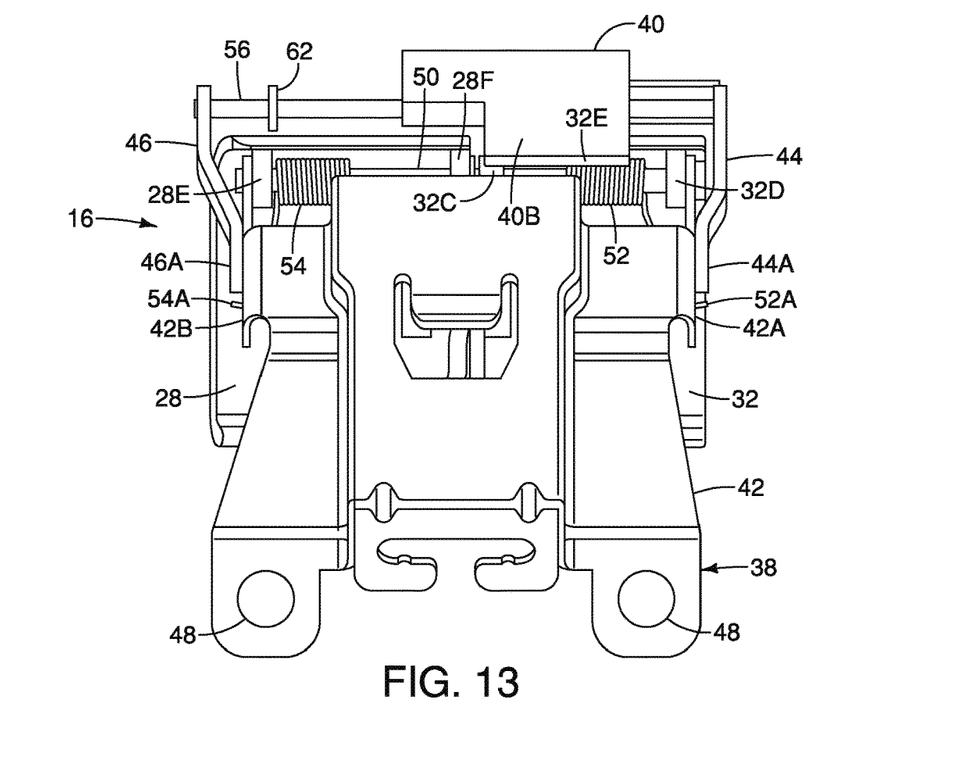
FIG. 13 is a rear elevational view of the hood release lever cover assembly of FIG. 11.

A first pin 50 is connected to the mounting body 42 of the bracket assembly 38, as shown in FIGS. 5, 6, 13 and 14. The first pin 50 is rigidly connected to the first and second mounting tabs 42A and 42B of the mounting body 42. The first pin 50 is connected to the first and second mounting tabs 42A and 42B in any suitable manner, such as with fasteners or by welding or swaging. The hood release lever 28 and the fuel tank door release lever 32 are movably connected to the first pin 50 to facilitate moving between the first and second positions. The mounting portions 28E and 28F of the hood release lever 28 pivotally connect the hood release lever 28 to the first pin 50, as shown in FIG. 13. Mounting portions 32C and 32D, as shown in FIG. 13, of the fuel tank door release lever 32 pivotally connect the fuel tank door release lever 32 to the first pin 50. As shown in FIGS. 3 and 15, the hood release lever 28 is moved in a counter-clockwise direction from the first position to the second position, and a clockwise direction when moving the hood release lever 28 from the second position to the first position. The fuel tank door release lever 32 is moved in a counter-clockwise direction from the first position to the second position, and a clockwise direction when moving the fuel tank door release lever 32 from the second position to the first position.

A first biasing member 52, such as a torsion spring, is disposed on the first pin 50 to bias the fuel tank door release lever 32 to the first position, as shown in FIGS. 5, 6, 13 and 14. The first biasing member 52 facilitates returning the fuel tank door release lever 32 to the first position (FIG. 3) from the second position (not shown). The first biasing member 52 has a first end connected to the fuel tank door release lever 32. A second end 52A of the first biasing member 52 is connected to the first mounting tab 42A of the mounting body 42 of the mounting bracket assembly 38.

Figure 5:
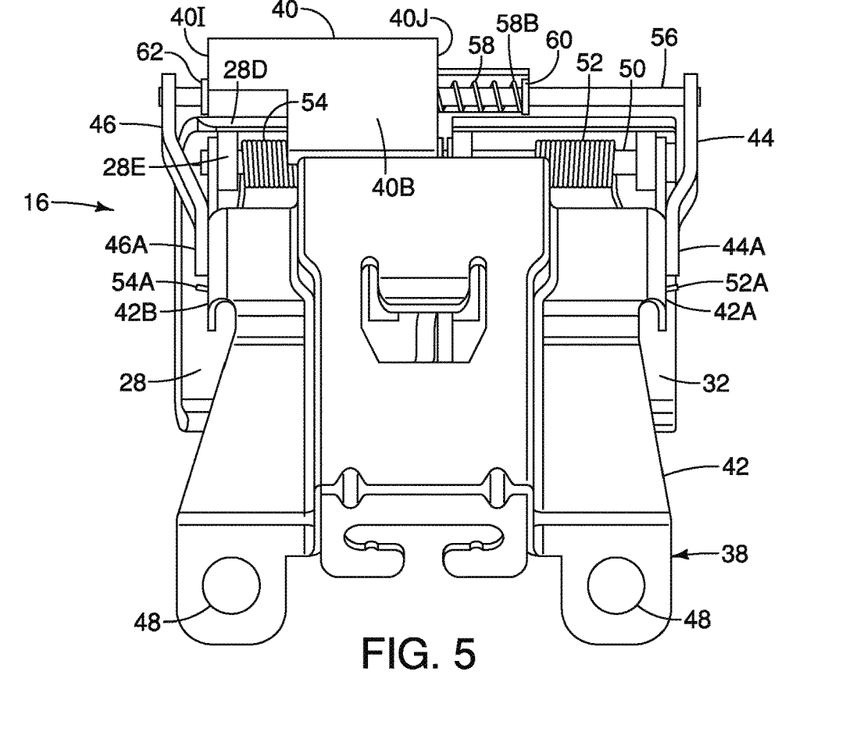
FIG. 5 is a rear elevational view of the hood release lever cover assembly of FIG. 3.
Figure 14:
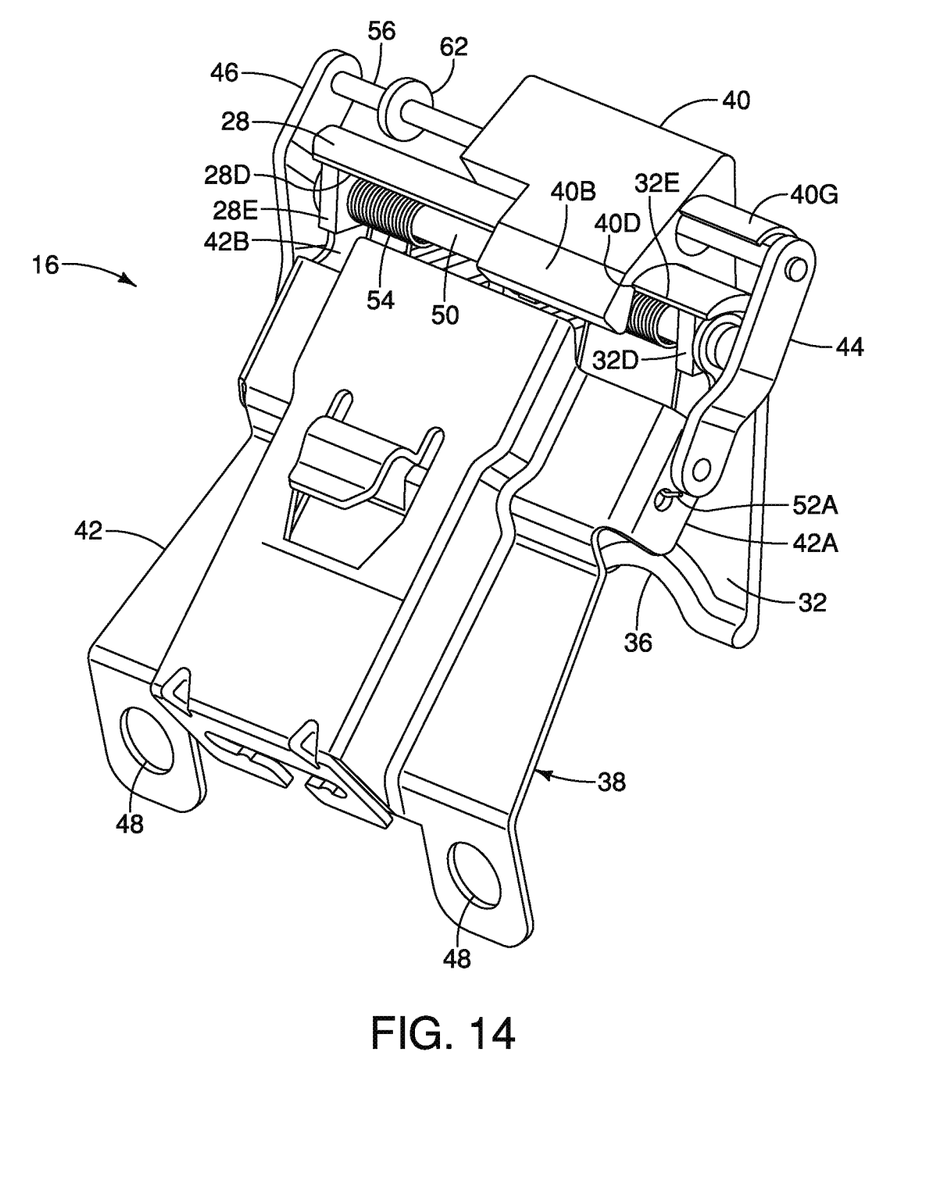
FIG. 14 is a rear perspective view of the hood release lever cover assembly of FIG. 11.

A second biasing member 54, such as a torsion spring, is disposed on the first pin 50 to bias the hood release lever 28 to the first position, as shown in FIGS. 5, 13 and 14. The second biasing member 54 facilitates returning the hood release lever 28 to the first position (FIG. 3) from the second position (FIG. 15). The second biasing member 54 has a first end connected to the hood release lever 28. A second end 54A of the second biasing member 54 is connected to the second mounting tab 42B of the mounting body 42 of the mounting bracket assembly 38.

Figure 11:
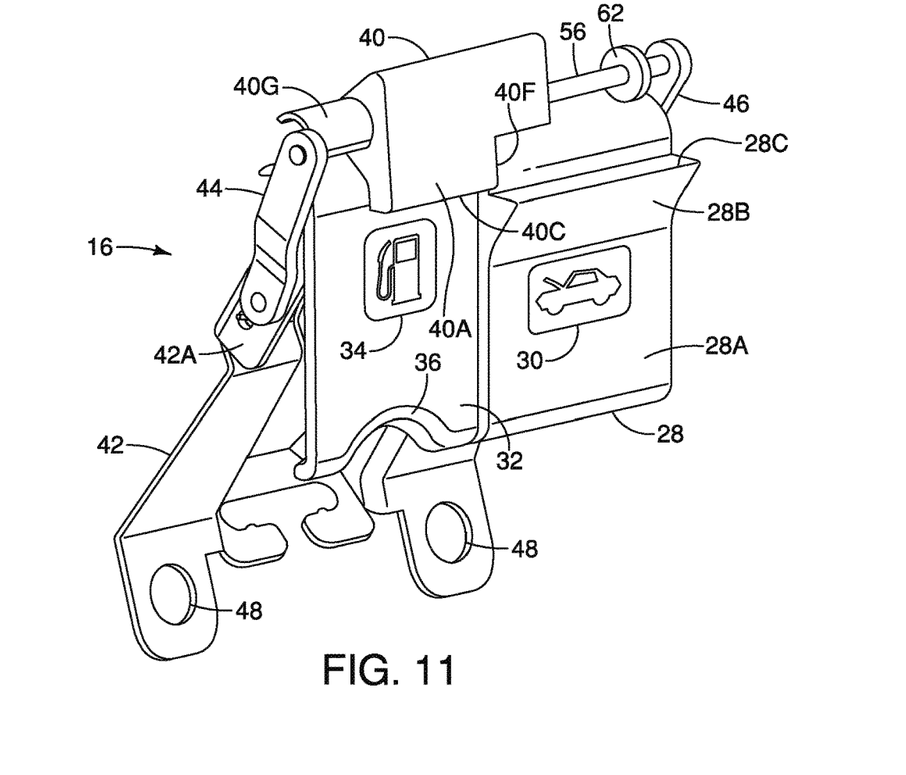
FIG. 11 is a perspective view of the hood release lever cover assembly of FIG. 3 in which the hood release lever cover is in a second position.
Figure 12:
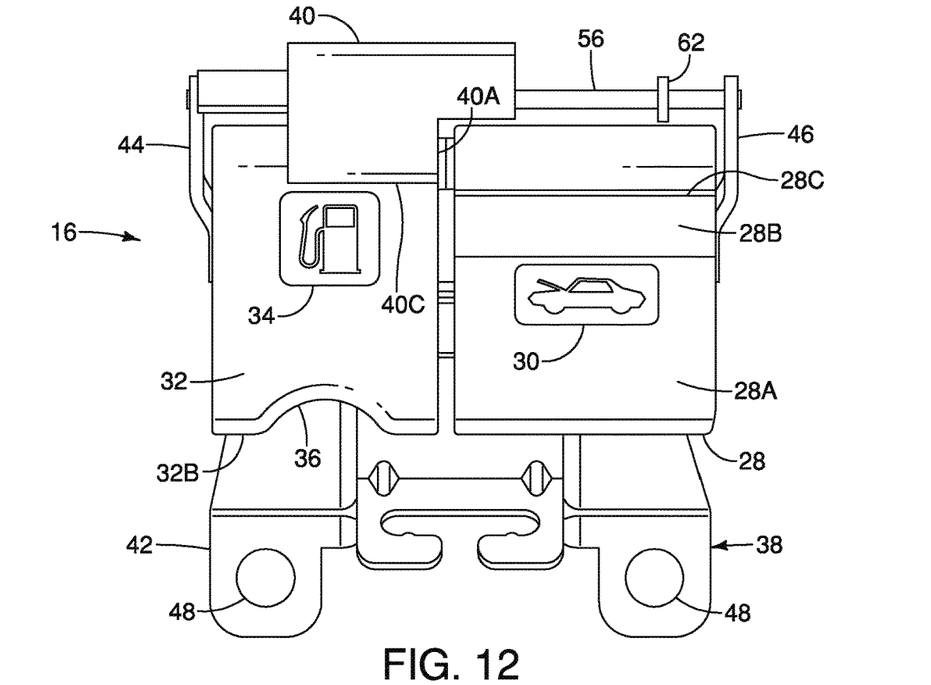
FIG. 12 is a front elevational view of the hood release lever cover assembly of FIG. 11.

A second pin 56 is connected to the mounting body 42 of the bracket assembly 38, as shown in FIGS. 3-6 and 11-15. The second pin 56 is rigidly connected to the first and second mounting arms 44 and 46 of the mounting body 42. A first end of the second pin 56 is connected to the first mounting arm 44, and a second end of the second pin 56 is connected to the second mounting arm 46. The second pin 56 is connected to the first and second mounting arms 44 and 46 in any suitable manner, such as with fasteners or by welding or swaging. The hood release lever cover 40 is slidably disposed on the second pin 56 to facilitate moving between the first and second positions. As shown in FIGS. 4 and 12, the hood release lever cover 40 is slid from right to left on the second pin 56 from the first position to the second position, and from left to right when moving the hood release lever cover 40 from the second position to the first position. As shown in FIGS. 5, 9 and 10, the first pin 50 is substantially parallel to the second pin 56. The second pin 56 is disposed above the first pin 50.

Figure 16:
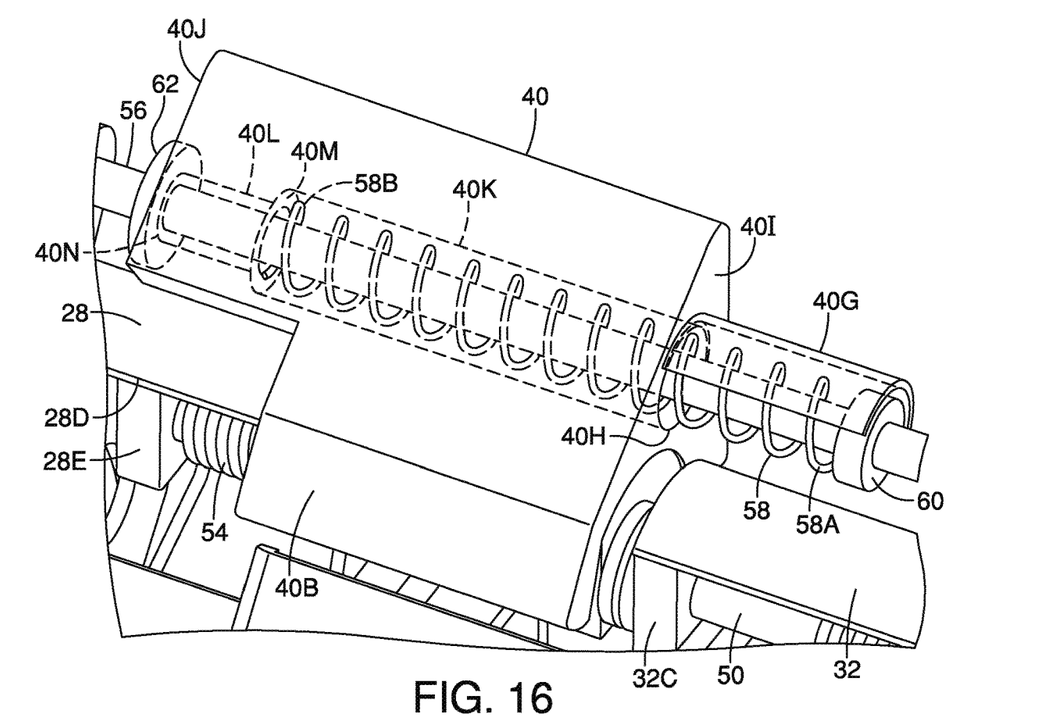
FIG. 16 is a perspective view of the hood release lever cover illustrating a biasing member biasing the hood release lever cover to the first position.

A first stop member 60 is fixed to the second pin 56, as shown in FIGS. 3, 5, 6, 8 and 16. The first stop member 60 is disposed closer to the first mounting arm 44 than to the second mounting arm 46. The first stop member 60 is disposed proximal an end of a cover portion 40G extending from a first end 40I of the hood release lever cover 40, as shown in FIGS. 3 and 16. A second stop member 62 is fixed to the second pin 56, as shown in FIGS. 4, 5 and 11-16. The second stop member 62 is fixed proximal the second mounting arm 46. A second end 40J of the hood release lever cover 40 contacts the second stop member 62 when the hood release lever cover 40 is in the first position, as shown in FIGS. 4 and 16.

A third biasing member 58, such as a torsion spring, is disposed on the second pin 56 to bias the hood release lever cover 40 to the first position, as shown in FIGS. 3-5 and 16. The third biasing member 58 extends between the first and second stop members 60 and 62. A first end 58A of the third biasing member 58 engages the first stop member 60, as shown in FIG. 16. A second end 58B of the third biasing member 58 is disposed in the hood release lever cover 40. The third biasing member 58 is received by a bore in the hood release lever cover 40. The second pin 56 is received by the bore to allow for sliding movement of the hood release lever cover 40 along the second pin 56. The bore has a first portion 40K and a second portion 40L. A diameter of the first portion 40K of the bore is larger than a diameter of the second portion 40L to define a shoulder 40M. The first portion 40K of the bore extends from the opening 40H in the first end 40I of the hood release lever cover 40 to the shoulder 40M. The second portion 40L of the bore extends from the shoulder 40M to the opening 40N in the second end 40J of the hood release lever cover 40. The diameter of the second portion 40L of the bore is less than a width of the third biasing member 58 such that the second end 58B of the third biasing member engages the shoulder 40M. Movement of the hood release lever cover 40 from the first position to the second position compresses the third biasing member 58 between the first stop member 60 and the shoulder 40M of the hood release lever cover 40.

The hood release lever cover 40 is slidably disposed on the second pin 56 between the first position (FIG. 4) and the second position (FIG. 12). The third biasing member 58 biases the hood release lever cover 40 to the first position, as shown in FIGS. 3-6 and 16. The third biasing member 58 facilitates returning the hood release lever cover 40 to the first position from the second position.

A first tab 40A extends outwardly from the hood release lever cover 40, as shown in FIGS. 3, 4 and 8-12. A second tab 40B extends outwardly from the hood release lever cover 40, as shown in FIGS. 5, 6, 8-10, 13 and 14. As shown in FIG. 9, the first and second tabs 40A and 40B are disposed on opposite sides of a vertical plane P through a longitudinal axis A of the second pin 56. The first tab 40A is disposed on a first side S1 of the vertical plane P and the second tab 40B is disposed on a second side S2 of the vertical plane P, as shown in FIG. 9.

Figure 8:
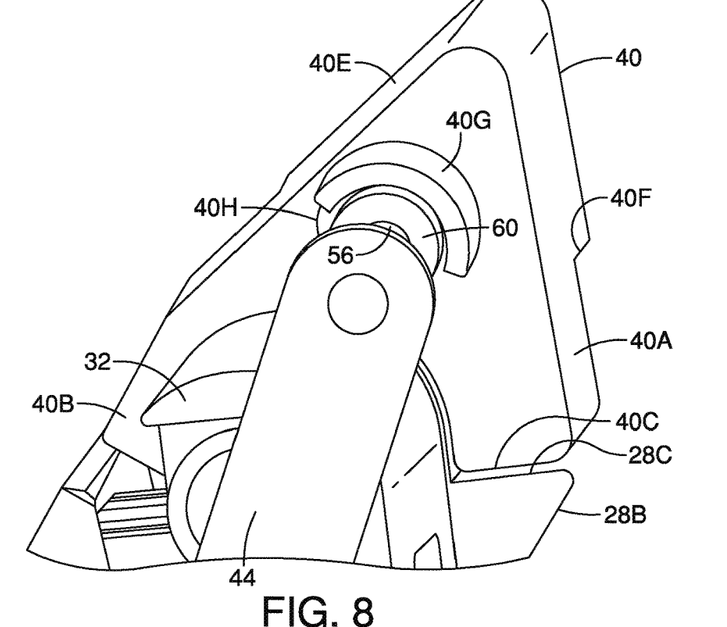
FIG. 8 is a side elevational view of the hood release lever cover assembly of FIG. 3.

The first tab 40A has a first contact surface 40C. The first contact surface 40C is configured to be engaged by the hood release lever 28 when attempting to move the hood release lever 28 to the second position when the hood release lever cover 40 is in the first position, as shown in FIGS. 8-10. The upper surface 28C of the projection 28B of the hood release lever 28 engages the first contact surface 40C of the hood release lever cover 40 when attempting to move the hood release lever 28 from the first position to the second position when the hood release lever cover 40 is in the first position, thereby substantially preventing movement of the hood release lever 28 from the first position toward the second position.

The second tab 40B of the hood release lever cover 40 has a groove 40D configured to be engaged by the arcuate portion 28D of the hood release lever 28 when attempting to move the hood release lever 28 from the first position to the second position when the hood release lever cover 40 is disposed in the first position, thereby further substantially preventing movement of the hood release lever 28 from the first position to the second position. The groove 40D is disposed in a surface of the second tab 40B facing the second pin 50 to which the hood release lever 28 is movably connected. The groove 40D forms a second contact surface substantially preventing movement of the hood release lever 28 from the first position to the second position when the hood release lever cover 40 is disposed in the first position.

The hood release lever cover 40 has a third contact surface 40E configured to engage the rear wall 26D of the recessed portion 26 when attempting to move the hood release lever 28 from the first position to the second position when the hood release lever cover 40 is disposed in the first position, thereby further substantially preventing movement of the hood release lever 28 from the first position to the second position. The third contact surface 40E is an upper portion of a rear surface of the hood release lever cover 40. A cutout portion 40F in the front surface 40A of the hood release lever cover 40 facilitates manipulating the hood release lever cover 40 to move the hood release lever cover 40 between the first and second positions.

The front surface 40A of the hood release lever cover 40 includes the cutout portion 40F to facilitate manipulating the hood release lever cover 40, such that the hood release lever cover 40 can be easily handled when moving between the first and second positions, as shown in FIGS. 3 and 15. The cutout portion 40F further provides clearance for movement of the hood release lever 28 from the first position to the second position, as shown in FIG. 15.

Figure 6:
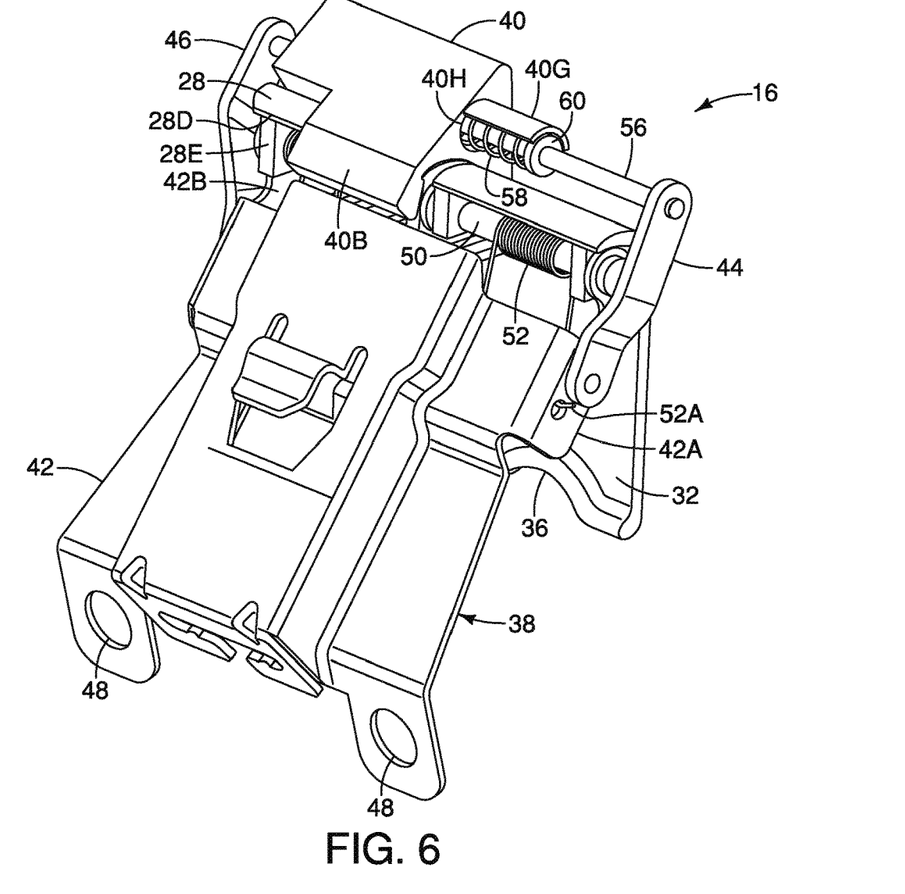
FIG. 6 is a rear perspective view of the hood release lever cover assembly FIG. 3.
Figure 7:
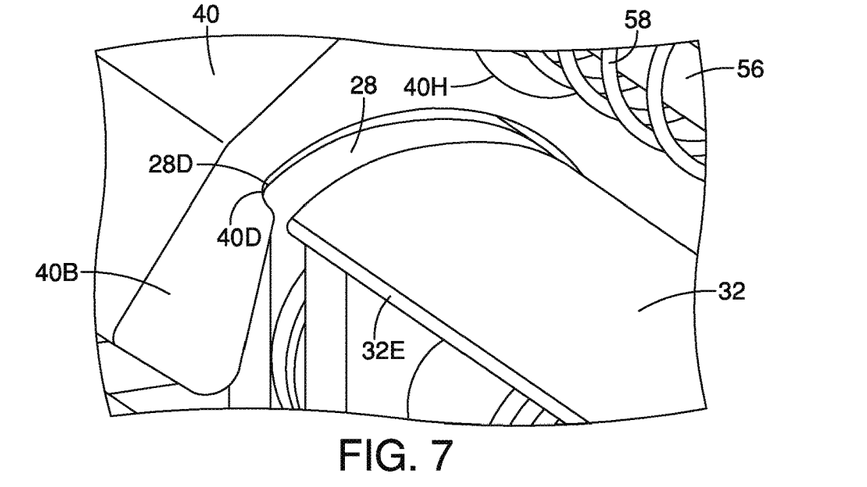
FIG. 7 is an enlarged rear perspective view of the hood release lever cover assembly of FIG. 6 illustrating engagement between the hood release lever cover and the hood release lever.

The cover portion 40G extends outwardly from the first end 40I of the hood release lever cover 40, as shown in FIGS. 3, 6 and 16. The cover portion 40G preferably extends in a direction substantially parallel to the second pin 56. As shown in FIGS. 4 and 16, the cover portion 40G covers the third biasing member 58 and the first stop member 60 to substantially prevent the third biasing member 58 and the first stop member 60 from being visible to a vehicle occupant.

The hood release lever cover assembly 16 is disposed in the recessed portion 26 of the instrument panel 22 of the vehicle body structure 12, as shown in FIGS. 2 and 15. The mounting body 42 of the bracket assembly 38 is connected to the rear wall 26D of the recessed portion 26. The at least one fastener opening 48 of the mounting body 42 receives a fastener to secure the hood release lever cover assembly 16 to the recessed portion 26. When the hood release lever cover assembly 16 is connected to the recessed portion 26, the first tab 40A of the hood release lever cover 40 is disposed in front of the hood release lever 28 when the hood release lever cover 40 is disposed in the first position, as shown in FIGS. 3 and 4, to substantially prevent movement of the hood release lever 28 from the first position to the second position. The hood release lever cover 40 is disposed in front of the fuel tank door release lever 32 in the second position, as shown in FIGS. 11 and 12, to allow movement of the hood release lever 28 from the first position to the second position. The hood release lever cover 40 further substantially prevents movement of the fuel tank door release lever 32 from the first position to the second position when the hood release lever cover 40 is in the second position, as shown in FIGS. 11 and 12. The fuel tank door release lever 32 is movable between the first and second positions when the hood release lever cover 40 is disposed in the first position, as shown in FIGS. 2-6.

To open the hood 20 of the vehicle 10, the hood release lever cover 40 is moved from the first position, as shown in FIGS. 2-6 and 16, to the second position, as shown in FIGS. 11-15. The cutout portion 40F of the hood release lever cover 40 facilitates moving the hood release lever cover 40 to the second position and holding the hood release lever cover 40 in the second position. The hood release lever cover 40 slides along the second pin 56 when moving from the first position to the second position. The groove 40D of the hood release lever cover 40 moves from the first position engaging the arcuate portion 28D of the hood release lever 28 to the second position engaging an arcuate portion 32E of the fuel tank door release lever 32. The hood release lever 28 can then be moved to the second position, as shown in FIG. 15. When the hood release lever 28 is moved to the second position, the hood 20 is moved to the released position shown in dashed lines in FIG. 1. The hood release lever cover 40 is maintained in the second position when moving the hood release lever 28 from the first position to the second position, as shown in FIG. 11-15, by applying force to the hood release lever cover 40. The hood release lever 28 pivots in the counter-clockwise direction when moving from the first position to the second position. The hood release lever cover 40 slides along the second pin 56 and the hood release lever 28 pivots about the first pin 50 when moving the hood release lever cover 40 and the hood release lever 28 between the first and second positions. The sliding movement of the hood release lever cover 40 is along a first axis of the second pin 56, and the pivoting movement of the hood release lever 28 is about a second axis of the first pin 50. The first and second axes are preferably substantially parallel.

When the hood release lever cover 40 is moved to the second position, the hood release lever cover 40 passes over the first stop member 60. The diameter of the first portion 40K of the bore is larger than the width of the first stop member 60, such that the hood release lever cover 40 passes over the first stop member 60. The shoulder 40M of the bore engages the second end 58B of third biasing member 56 to compress the third biasing member 58 between the shoulder 40M and the first stop member 60. When the hood release lever cover 40 is released, the third biasing member 58 returns the hood release lever cover 40 to the first position. The second stop member 62 stops movement of the hood release lever cover 40 away from the first stop member 60.

When the hood 20 is released, the hood release lever 28 is released and the second biasing member 54 returns the hood release lever 28 to the first position. The hood release lever 28 pivots in the clockwise direction when moving from the second position to the first position. The hood release lever cover 40 can then be released, and the third biasing member 58 returns the hood release lever cover 40 to the first position.

As shown in FIGS. 8-10, the hood release lever cover 40 substantially prevents movement of the hood release lever 28 from the first position to the second position when the hood release lever cover 40 is disposed in the first position. When the hood release lever 28 is attempted to be moved to the second position when the hood release lever 40 is in the first position, the hood release lever cover 40 substantially prevents movement of the hood release lever 28 to the second position. The upper surface 28C of the projection 28B of the hood release lever 28 engages the first contact surface 40C of the first tab 40A of the hood release lever cover 40. The projection 28B of the hood release lever 28 contacting the first tab 40A of the hood release lever cover 40 defines a first point of contact C1 substantially preventing movement of the hood release lever 28 to the second position when the hood release lever cover 40 is disposed in the first position.

The arcuate portion 28D of the hood release lever 28 engages the groove 40D of the second tab 40B of the hood release lever cover 40. The arcuate portion 28D of the hood release lever 28 contacting the groove 40D of the second tab 28B defines a second point of contact C2 substantially preventing movement of the hood release lever 28 to the second position when the hood release lever cover 40 is disposed in the first position.

The third contact surface 40E of the hood release lever cover 40 contacts the rear wall 26D of the recessed portion 26 when attempting to move the hood release lever 28 from the first position to the second position. The third contact surface 40E of the hood release lever cover 40 contacting the rear wall 26D of the recessed portion 26 defines a third point of contact C3 substantially preventing movement of the hood release lever 28 to the second position when the hood release lever cover 40 is disposed in the first position.

The first point of contact C1 and the second point of contact C2 are disposed on opposite sides of a line L connecting longitudinal centers A and B of the first pin 50 and the second pin 56, respectively, as shown in FIG. 10. The second and third points of contact C2 and C3 are disposed on the same side of the line L. The first point of contact C1 is disposed on a first side S3 of the line L. The second and third points of contact C2 and C3 are disposed on a second side S4 of the line L. The first and second sides S3 and S4 extend in opposite directions from the line L. The three points of contact C1-C3 of the hood release lever cover 40 substantially prevents slight or rocking movement of the hood release lever cover 40, thereby providing a rigid hood release lever cover assembly 16.

Operation of both the hood release lever cover 40 and the hood release lever 28 is a two-step process, thereby further substantially preventing accidental operation of the hood release lever 28. In the first step, the hood release lever cover 40 is slidably moved on the first pin 50 such that the hood release lever 28 can be pivoted about the second pin 56. In the second step, the hood release lever 28 is pivotally moved to release the hood 20. The two-step process likely requires a separate hand for each step, thereby substantially preventing accidental operation of the hood release lever 28.

The fuel tank door release lever 32 can be moved between the first and second positions when the hood release lever cover 40 is disposed in the first position, as shown in FIGS. 2-6. When the hood release lever cover 40 is disposed in the second position, as shown in FIGS. 11-15, the hood release lever cover 40 prevents movement of the fuel tank door release lever 32 from the first position to the second position. The groove 40D of the hood release lever cover 40 is engaged by the arcuate portion 32E of the fuel tank door release lever 32 to substantially prevent movement of the fuel tank door release lever 32 toward the second position.

Figure 17:
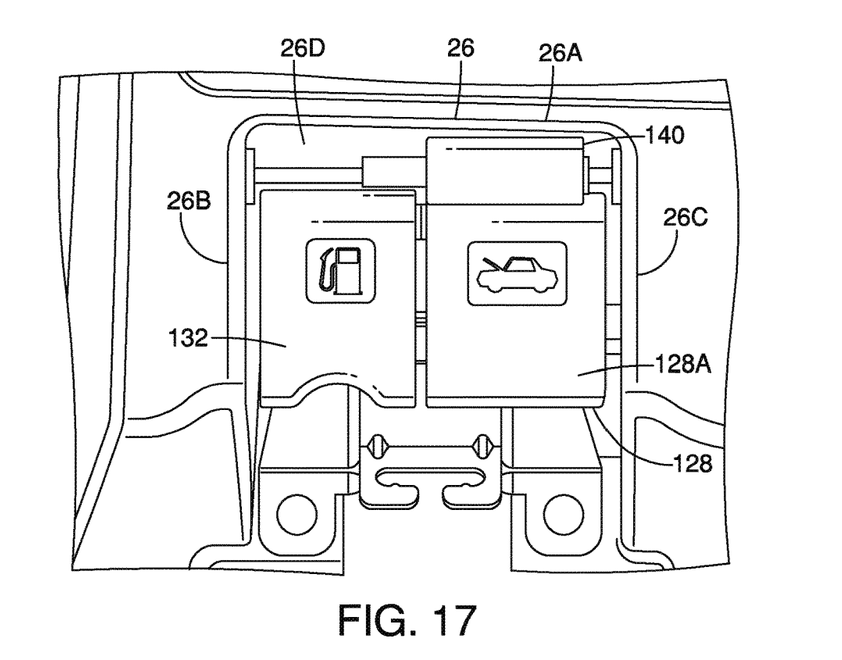
FIG. 17 is a front elevational view of the hood release lever cover assembly in accordance with another exemplary embodiment of the present invention in which the hood release lever cover is in a first position and the hood release lever is in a first position.

As shown in FIG. 17, a hood release lever cover assembly 116 in accordance with another illustrated exemplary embodiment of the present invention is substantially similar to the hood release lever cover assembly 16 of the exemplary embodiment illustrated in FIGS. 1 to 16 except for the differences described below. Similar parts are identified with similar reference numerals, except increased by 100 (i.e., 1xx, accordingly).

The hood release lever 128 is substantially similar to the hood release lever 28 of the hood release lever cover assembly 16 except that the hood release lever 128 does not have the projection 28B (FIG. 3) extending outwardly from the front surface 128A, as shown in FIG. 17. Otherwise, the hood release lever cover assembly 116 is configured and operates substantially similarly to the hood release lever cover assembly 16 of FIGS. 1-16. The hood release lever cover 140 has two points of contact (C2 and C3 in FIG. 10) to substantially prevent movement of the hood release lever 128 from the first position to the second position when the hood release lever cover 140 is disposed in the first position, as shown in FIG. 17.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hood release lever cover assembly. Accordingly, these terms, as utilized to describe the present invention should be interpreted relative to a vehicle equipped with the hood release lever cover assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A release lever cover assembly for a vehicle, the release lever cover assembly comprising:
   a bracket assembly configured to be connected to a vehicle body structure of the vehicle;
   a first release lever pivotally connected to the bracket assembly, the first release lever being pivotable about a first axis between a first position and a second position in which a vehicle component is released; and
   a release lever cover slidably connected to the bracket assembly, the release lever cover being slidable along a second axis between a first position preventing movement of the first release lever and a second position allowing movement of the first release lever, the second axis being substantially parallel to the first axis.

2. The release lever cover assembly according to claim 1, wherein
   a first pin is connected to the bracket assembly, the first release lever being pivotally connected to the first pin.

3. The release lever cover assembly according to claim 2, wherein
   a second pin is connected to the bracket assembly, the release lever cover being slidably connected to the second pin.

4. The release lever cover assembly according to claim 3, wherein
   the first pin is substantially parallel to the second pin.

5. The release lever cover assembly according to claim 3, wherein
   the second pin is disposed above the first pin.

6. The release lever cover assembly according to claim 2, wherein
   a first biasing member is disposed on the first pin to bias the first release lever in the first position; and
   a second biasing member is disposed on the second pin to bias the release lever cover to the first position.

7. The release lever cover assembly according to claim 2, wherein
   a second release lever is pivotally connected to the first pin of the bracket assembly, the second release lever being movable between a first position and a second position.

8. The release lever cover assembly according to claim 7, wherein
   the release lever cover is disposed in front of the first release lever in the first position and in front of the second release lever in the second position.

9. The release lever cover assembly according to claim 8, wherein
   the release lever cover prevents movement of the second release lever when the release lever is in the second position.

10. The release lever cover assembly according to claim 2, wherein
    a tab extends outwardly from the release lever cover, a projection extends outwardly from the release lever, and the projection contacts the tab when the release lever cover is in the first position to prevent movement of the release lever from the first position to the second position.

11. The release lever cover assembly according to claim 10, wherein
a groove is disposed in the release lever cover, and an arcuate portion of the release lever contacts the groove when the release lever cover is in the first position to prevent movement of the release lever from the first position to the second position.

12. The release lever cover assembly according to claim 11, wherein
the projection contacting the tab defines a first point of contact and the arcuate portion contacting the groove defines a second point of contact, the first point of contact and the second point of contact being disposed on opposite sides of a line connecting centers of the first and second pins.

13. A release lever cover assembly for a vehicle, the release lever cover assembly comprising:
a recessed portion disposed in a vehicle body structure;
a bracket assembly disposed in the recessed portion of the vehicle body structure, the bracket assembly including a first pin and a second pin;
a first release lever pivotally connected to the first pin of the bracket assembly, the first release lever being pivotable about a first axis between a first position and a second position in which a vehicle component is released; and
a release lever cover slidably connected to the second pin of the bracket assembly, the release lever cover being slidable along a second axis between a first position preventing movement of the first release lever and a second position allowing movement of the first release lever, the second axis being substantially parallel to the first axis.

14. The release lever cover assembly according to claim 13, wherein
a first biasing member is disposed on the first pin to bias the first release lever in the first position.

15. The hood release lever cover assembly according to claim 14, wherein
a second biasing member is disposed on the second pin to bias the release lever cover to the first position.

16. The release lever cover assembly according to claim 13, wherein
a tab extends outwardly from the release lever cover, a projection extends outwardly from the release lever, and the projection contacts the tab when the release lever cover is in the first position to prevent movement of the release lever from the first position to the second position.

17. The release lever cover assembly according to claim 16, wherein
a groove is disposed in the release lever cover, and an arcuate portion of the release lever contacts the groove when the release lever cover is in the first position to prevent movement of the release lever from the first position to the second position.

18. The release lever cover assembly according to claim 17, wherein
the projection contacting the tab defines a first point of contact and the arcuate portion contacting the groove defines a second point of contact, the first point of contact and the second point of contact being disposed on opposite sides of a line connecting centers of the first and second pins.

19. The release lever cover assembly according to claim 17, wherein
the release lever cover engages a wall of the recessed portion to prevent movement of the release lever from the first position to the second position when the release lever is in the first position, the engagement between the release lever and the wall of the recessed portion defining a third point of contact.

20. A release lever cover assembly for a vehicle, the release lever cover assembly comprising:
a bracket assembly configured to be connected to a vehicle body structure of the vehicle;
a first release lever pivotally connected to the bracket assembly, the first release lever being movable between a first position and a second position in which a vehicle component is released;
a release lever cover slidably connected to the bracket assembly, the release lever cover being movable between a first position preventing movement of the first release lever and a second position allowing movement of the first release lever;
a first pin connected to the bracket assembly, the first release lever being pivotally connected to the first pin; and
a second release lever pivotally connected to the first pin of the bracket assembly, the second release lever being movable between a first position and a second position.

* * * * *